United States Patent [19]

Kingston et al.

[11] Patent Number: 5,033,869

[45] Date of Patent: Jul. 23, 1991

[54] LINEAR SLIDER WITH FLOATING BUSHING

[75] Inventors: Richard A. Kingston, Beverly, Mass.; Steven C. Farley, Exeter, N.H.

[73] Assignee: GTE Products Corporation, Danvers, Mass.

[21] Appl. No.: 619,637

[22] Filed: Nov. 29, 1990

[51] Int. Cl.[5] ........................ F16C 29/02; F16C 33/10

[52] U.S. Cl. ........................................ 384/38; 384/13; 384/29

[58] Field of Search .................... 384/7, 13, 16, 26, 29, 384/38, 43

[56] References Cited

U.S. PATENT DOCUMENTS

| | | | |
|---|---|---|---|
| 2,062,862 | 12/1936 | Calame | 384/13 |
| 2,762,661 | 9/1956 | Sloyan | 384/7 |
| 2,833,597 | 5/1958 | Sloyan | 384/38 |
| 4,163,590 | 8/1979 | Dwyer et al. | 384/38 |
| 4,264,112 | 4/1981 | Magnuson | 384/29 |
| 4,637,738 | 1/1987 | Barkley | 384/38 |
| 4,729,145 | 3/1988 | Egner-Walter et al. | 384/38 X |

*Primary Examiner*—Thomas R. Hannon

*Attorney, Agent, or Firm*—William E. Meyer

[57] ABSTRACT

A linear slider may be formed essentially from a block and two parallel shafts mounted through the block. The first shaft runs on coaxial bushings, while the second shaft runs in a single floating bushing. The floating bushing slides perpendicular to the first shaft. The first and second shafts are then coupled to slide as a pair. The first shaft is then free to run back and forth. The second shaft also runs back and forth, but prevents the first shaft from rotating, without binding between the two shafts. Seals and a lubrication system are added to assure a smooth, durable action.

9 Claims, 2 Drawing Sheets

LINEAR SLIDER WITH FLOATING BUSHING

TECHNICAL FIELD

The invention relates to industrial equipment and particularly to linear sliders. More particularly the invention is concerned with a parallel shaft linear slider with a floating bushing.

BACKGROUND ART

A slider is commonly used in an industrial processes where a tool or part is attached to the slider end. The tool is then slid forward to perform a function. The tool is then withdrawn by sliding the slider back. Sliders are commonly used in high production machinery where the same action is repeated for hundreds or thousand of parts an hour, for example, as part of an assembly line station. Sliders must then have long service lives, provide accurate positioning, and still be inexpensive to make and service.

U.S. Pat. No. 2,062,862 issued Dec. 1, 1936 to G. J. Calame for Guide for Blade Frames of Slicing machines shows a sliding device with parallel sliding elements.

U.S. Pat. No. 2,762,661 issued Sept. 11, 1956 to J. J. Sloyan for Machinery Supports shows a sliding device with parallel sliding elements.

U.S. Pat. No. 2,833,597 issued May 6, 1958 to J. J. Sloyan for Machinery Supports shows a sliding device with parallel sliding elements.

U.S. Pat. No. 4,163,590 issued Aug. 7, 1979 to Gregory J. Dwyer et al for Universal Floating Guide Means shows a sliding device with parallel sliding elements.

U.S. Pat. No. 4,264,112 issued Apr. 28, 1981 to Robert E. Magnuson et al for Floating Pillow Blocks shows a sliding device with parallel sliding elements.

U.S. Pat. No. 4,637,738 issued Jan. 20, 1987 to Robert E. Magnuson et al for Alignment Compensation for Linear Bearings shows a sliding device with parallel sliding elements.

U.S. Pat. No. 4,729,145 issued Mar. 8, 1988 to Bruno Egner-Walter et al for Device, Especially Reciprocating Wiper System for Motor Vehicles shows a sliding device with parallel sliding elements.

DISCLOSURE OF THE INVENTION

A linear slider may be formed with a slider block having a main passage extending through the slider block, a guide shaft passage extending through the slider block, parallel with and offset from the main passage, and a cross channel coplanar with the main passage and guide passage, intersecting and extending perpendicular to the guide passage. A first fixed main shaft support may be positioned in a first end of the main shaft passage, and a second fixed main shaft support, may be positioned in an opposite end of the main shaft passage. A floating bushing is positioned in the cross channel, having an exterior surface slidingly complementary with the interior surface of the cross channel. The floating bushing has a through passage coaxially alignable with the guide passage. A main shaft, having a first end, and an axial extension extends through the main passage and is supported by the first fixed main shaft support, and the second fixed main shaft support. A guide shaft, having a first end and an axial extension extends through the guide passage and the floating bushing through passage, and is supported, at least in part by the floating bushing. The guide shaft is formed to have a slidingly complementary surface with respect to the through passage of the floating bushing. A first end coupler, couples between the first end of the main shaft and the adjacent first end of the guide shaft.

BEST MODE FOR CARRYING OUT THE INVENTION

Figure 1:
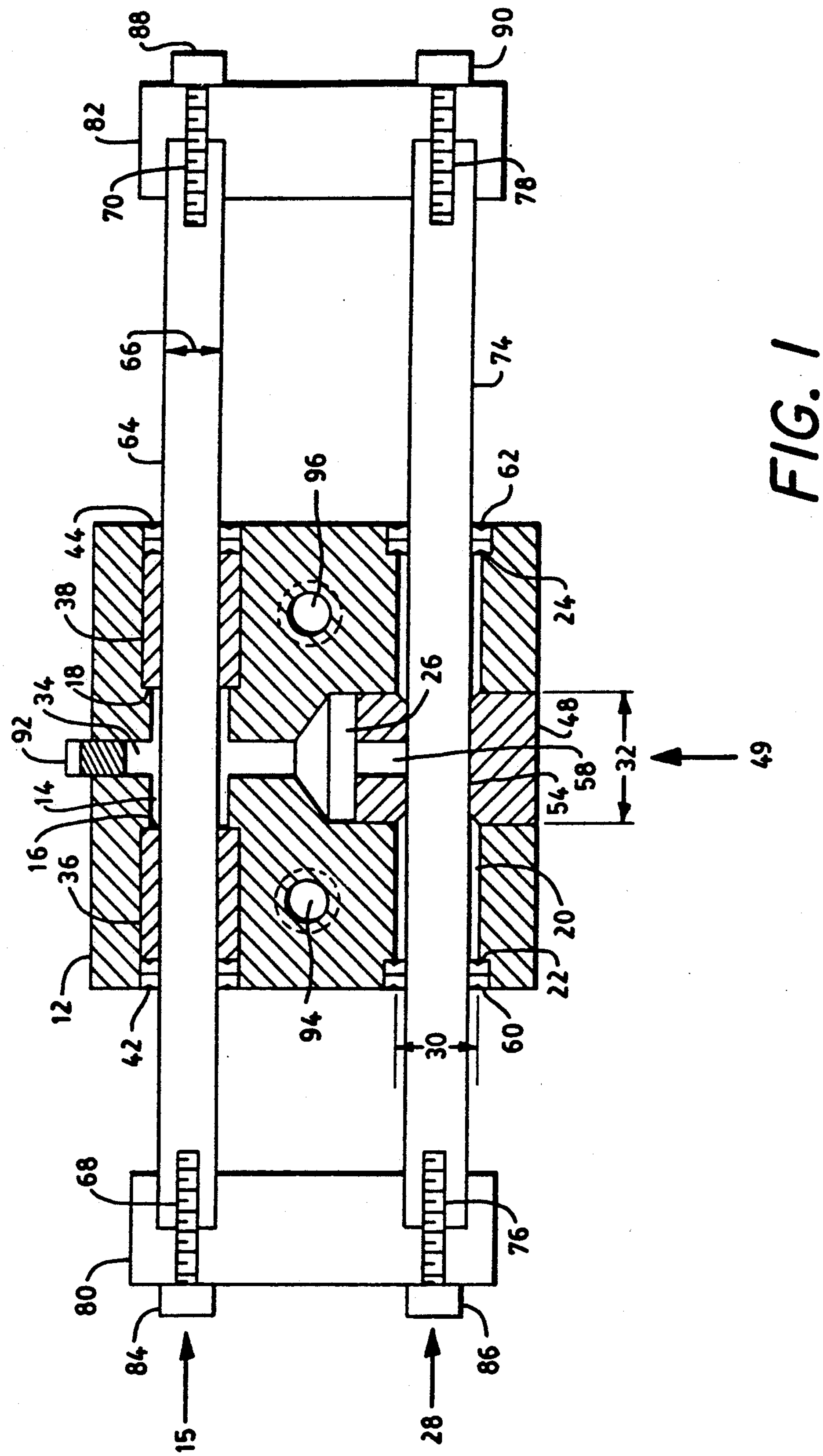
FIG. 1 shows a cross sectional view of a preferred embodiment of a linear slider.
Figure 2:
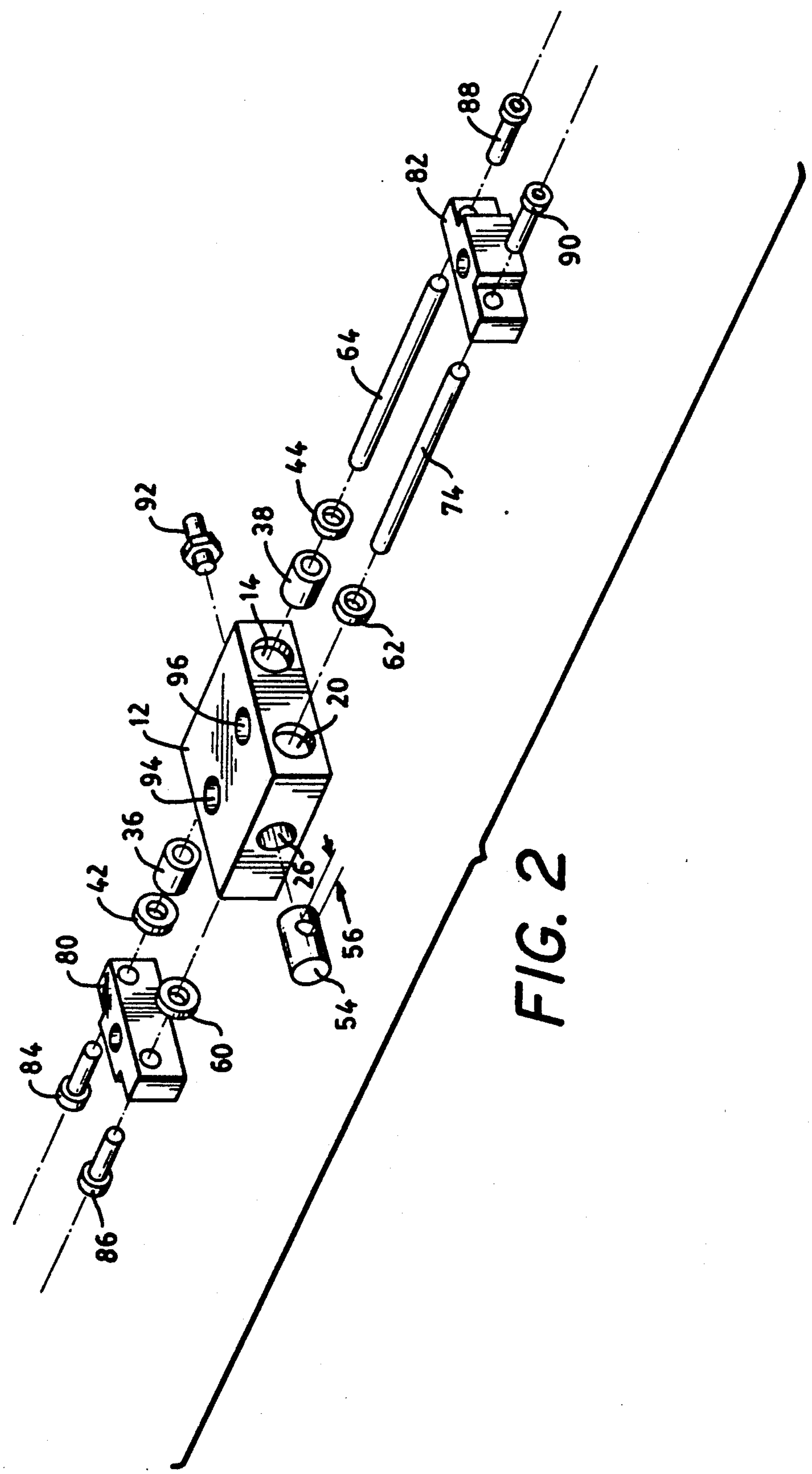
FIG. 2 shows an exploded view of a preferred embodiment of a linear slider.

FIG. 1 shows a cross sectional view of a preferred embodiment of a linear slider 10. FIG. 2 shows an exploded diagram of the preferred linear slider 10. The linear slider 10 may be assembled from a slider block 12, a first fixed bushing 36, second fixed bushing 38, a floating bushing 48, a main shaft 64, a guide shaft 74, a first end coupler, a second end coupler and a number of seals.

The slider block 12 may be formed from a solid metal piece with included passages. The preferred slider block 12 has a main shaft passage 14 that extends along an axis 15 through the slider block 12. The preferred main shaft passage 14 is a cylindrical passage, with internal shoulders 16, 18 formed to face towards the open ends. The shoulders 16, 18 are not necessary for proper slider functioning, but make assembly easier and may make machining of bore for seals and bushings easier.

Extending through the slider block 12, parallel with and offset from the main shaft passage 14, is a guide shaft passage 20. The preferred guide shaft passage 20 is also a cylindrical passage, with internal shoulders 22, 24 formed to face towards the open ends.

Extending in the slider block 12, and at least transverse to a portion of the guide shaft passage 20 is a cross channel 26. In the preferred embodiment, the guide shaft passage 20 axis 28 is coplanar with, and perpendicular to the cross channel 26 axis. The preferred guide shaft passage 20 has a smaller diameter 30 than the cross channel diameter 32.

Also included in the slider block 12 may be a system of lubrication channels 34. The lubrication channels 34 may be formed to conveniently link, and provide lubrication for the floating bushing 48, main shaft 64, and guide shaft 74. The preferred embodiment includes a system of lubrication channels 34 intersecting the main shaft passage 14, the guide shaft passage 20, and cross channel 26 for lubrication, such as by passive oil. The lubrication system in one embodiment intersects the main shaft passage 14 between the internal shoulders 16, 18, intersects the guide shaft passage 20 between the internal shoulders 22, 24, and intersects an internal end of the cross channel 26. The slider block 12 may also include bolt passages 94, 96 or other coupling means for anchoring the linear slider 12.

The slider block 12 supports in one end of the main shaft passage 14, a first fixed bushing 36 and supports in the opposite end of the main shaft passage 14 a second fixed bushing 38. The first fixed bushing 36, and second fixed bushing 38 may have cylindrical forms with outside diameters nearly equal to the outer diameter of the main shaft passage 14. The first main shaft passage shoulder 16 has a height less than or equal to the thickness of the first fixed bushing 36. The inner diameter of the first fixed bushing 36 is then somewhat less than the smallest diameter of the main shaft passage 14. The axial extension of the main shaft passage 14 is more than twice as long as the axial extension of the first fixed bushing 36. The second fixed bushing 38 is similarly formed. The first fixed bushing 36, and second fixed bushing 38 may then be inserted in opposite ends of the main shaft passage 14 abutting the internal shoulders 16, 18. Roller, or other shaft bearings may be substituted for the fixed bushings 36, 38.

Positioned coaxially and adjacent the end of the first fixed bushing 36 may be a first main shaft seal 42. The first main shaft seal 42 has an internal diameter approximately equal to the first fixed bushing inner diameter. The preferred first main shaft seal 42 is a "V" type seal. Designed for use adjacent the second fixed bushing 38 along the opposite end of the main shaft, may be a similar second main shaft seal 44.

The slider block 12 also supports the floating bushing 48. The preferred floating bushing 48 has a cylindrical form with an outer diameter nearly equal to the cross channel diameter 32, and an axis 49 with a length greater than the guide shaft passage diameter 30. The floating bushing 48 is then movable in the cross channel 26. The floating bushing 48 further includes a guide shaft through passage 54 transverse to the floating bushing 48 axis, with a diameter 56 nearly equal to the diameter of the guide shaft. The guide shaft 74 may then be threaded through the floating bushing 48 for a close, but slidable coupling with the floating bushing 48. Extending from a lubricated portion of the cross channel 26 through the floating bushing 48 to the guide shaft through passage 54 may be a lubrication link 58. The preferred lubrication link 58 passage is an axial passage extending from an internal end of the floating bushing 48 to the guide shaft through passage 54. The Applicants find an exterior seal is not necessary for the floating bushing 48. The axial travel of the floating bushing 48 is small, so any pumping action that might draw the oil out is small enough to be insubstantial. A seal for the floating bushing 48 may be used if desired.

Positioned coaxially and adjacent an end of the guide shaft passage 20 is a first guide shaft seal 60. The first guide shaft seal 60 has an internal diameter less than the inner diameter of the guide shaft passage 20. The preferred first guide shaft seal 60 is a "V" type seal. On the opposite end of the guide shaft passage 20, may be a similar second guide shaft seal 62. The first guide shaft seal 60 and second guide shaft seal 62 may then be inserted in the exterior ends of the guide shaft passage 20 respectively.

The preferred main shaft 64 has a cylindrical form, a diameter 66 nearly equal to the inside diameters of the first fixed bushing 36 and second fixed bushing 38 to form a close, but slidable coupling with the fixed bushings 36, 38. The main shaft 64 has an axial extension that exceeds the axial length of the main shaft passage 14 by at least the distance intended for axial motion of the main shaft 64. The length of the main shaft is limited only by the mounting and loading aspects of the shaft, seals, and slider block. Long shafts, under severe load may deform the seals, bushings, or slider block. The preferred main shaft 64 is a smooth surfaced cylindrical bar. Along the main shaft 64 is a first end coupling 68. The first end coupling 68 may be any convenient means to couple with a shaft end. The preferred first end coupling 68 is an internally threaded passage coaxially formed in a first end of the main shaft 64 and adequate to receive a screw or bolt. On the opposite end of the main shaft 64 a similar, second end coupling 70 may be formed. Alternatively, the first end of the main shaft 64 could be externally threaded.

The preferred guide shaft 74 has a cylindrical form, a diameter nearly equal to the guide shaft through passage diameter 56 formed in the floating bushing 48. The guide shaft 74 also has an axial extension greater than the axial extension of the guide shaft passage 20. Preferably the main shaft 64, and guide shaft 74 have extensions that equally exceed those of the respective main and guide shaft passages 12, 20, as the lesser extension would act as the limitation for the whole assembly. The preferred guide shaft 74 is a smooth surfaced cylindrical bar. Along a first end of the guide shaft 74 is a first end coupling 76. The first end coupling 76 may be any convenient means to couple with a shaft end. The preferred first end coupling 76 is an internally threaded passage coaxially formed in a first end of the guide shaft 74. Alternatively, the first end of the guide shaft 74 could be externally threaded. On the opposite end of the guide shaft 74, a similar, second end coupling 78 may be formed.

The main shaft 64 is coupled along a first end to a first end coupler 80 that extends transverse to the main shaft axis. The first end coupler 80 should be rigid with respect to transaxial rotations from the main shaft axis. The preferred first end coupler 80 is a metal block with a cylindrical passage with a diameter nearly equal to the diameter of the main shaft 64 extending partially through the first end coupler 80. A smaller passage extends through the partial passage adequate to receive a screw or bolt to be threaded to couple the main shaft 64 to the first end coupler 80. The first end coupler 80 has a similar coupling formed for the guide shaft 74. A second end coupler 82, similar to the first end coupler 80 may be formed to couple between the main shaft second end coupling 70, and the guide shaft second end coupling 78. The second end coupler 82 is considered optional, but is used in the preferred embodiment.

The linear slider 10 may be assembled by inserting into the main shaft passage 14 the first fixed bushing 36, and second fixed bushing 38 to snugly abut the internally formed shoulders 16, 18. The main shaft 64 is then inserted throughout the first fixed bushing 36 and second fixed bushing 38 to extend axially through the main shaft passage 14. Adjacent the exterior end of the first fixed bushing 36, the first main shaft seal 42 is positioned around the main shaft 64. The second main shaft seal 46 is similarly positioned on the opposite end of the main shaft 64.

The floating bushing 48 is inserted in the cross channel 26, and the floating bushing through passage 54 is aligned to be coaxial with the guide shaft passage 20 axis 28. The guide shaft 74 is then inserted axially through the guide shaft passage 20, and the floating bushing through passage 54. The preferred guide shaft 74 may then rotate in the floating bushing 48, and move perpendicular to the main shaft 64 as the floating bushing 48 moves in the cross channel 26.

In the exterior end of the guide shaft passage 20, the first guide shaft seal 60 is positioned around the first end of the guide shaft 74. The second guide shaft seal 62 is similarly installed around the second end of the guide shaft 74. The main shaft 64 and guide shaft 74 having been installed, and are now slidable on their respective bushings and seals.

Mounted on the first end of the main shaft 64 and the first end of the guide shaft 74 is the first end coupler 80. Screws or bolts are then threaded through the first end coupler 80 to thread with the respective coaxial passage formed in the end of the main shaft 64 and the guide shaft 74. The first end coupler 80 is thereby firmly coupled to the main shaft 64 and guide shaft 74 by bolts 84, 86. The second end coupler 82 may be similarly mounted to the second ends of the main shaft 64 and guide shaft 74 by bolts 88, 90. Oil is now added to the lubrication channels 34 and sealed in place, for example by a threaded plug 92. The linear slider 12 may now be bolted in place by bolt holes 94 and 96.

In general operation, the main shaft 64 and guide shaft 74 then slide respectively through the main shaft passage 14 and guide shaft passage 20 as a rigid pair bound together by the end couplers 80, 82. In particular operation, the main shaft 64 slides and is lubricated in the main shaft passage 14, supported by the fixed end bushings 36, 38. The main shaft 64 is prevented from coaxially rotating by end couplers 80, 82 coupled to the guide shaft 74. The guide shaft 74 moves axially in parallel with the main shaft 64. The guide shaft 74 is prevented from rotating about the axis of the main shaft 64 by the floating bushing 48 that floats radially with respect to the axis of the main shaft 64. The guide shaft 74 is fixed in the guide shaft passage 20 rotationally with respect to the main shaft axis. The linear slider 10 does not bind with respect to in-plane deviations between the main shaft 64 and guide shaft 74 because of the perpendicular freedom of the floating bushing 48. The two fixed end bushings 36, 38 and the floating bushing 48 prevent out-of-plane deviations between the shafts.

Several different size units have been constructed. Some of the dimensions were as follows: shafts have had diameters of 0.635 cm (0.25 inch), 0.9525 cm (0.375 inch), 1.27 cm (0.5 inch) and 1.905 cm (0.75 inch). Stroke lengths have ranged from 1.27 cm (0.5 inch) to 15.24 cm (6.0 inch). Applicants feel that stroke lengths of several feet would be practical. The slider block dimensions depend on the particular application, but have ranged from 7.62 cm×5.08 cm (3.0×2.0 inch) to 15.24 cm×15.24 cm (6.0 ×6.0 inch). The remaining dimensions in general follow from the shaft diameter, shaft stroke length, and size of the block selected. The disclosed operating conditions, dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A linear slider comprising:

a) a slider block having a main passage extending through the slider block, a guide shaft passage extending through the slider block, parallel with and offset from the main passage, and a cross channel coplanar with the main passage and guide passage, intersecting and extending perpendicular to the guide passage, b) a first fixed main shaft support positioned in a first end of the main shaft passage, and a second fixed main shaft support, positioned in an opposite end of the main shaft passage, c) a floating bushing positioned in the cross channel and having an exterior surface slidingly complementary with the interior surface of the cross channel, the floating bushing further having a through passage coaxially alignable with the guide passage, d) a main shaft, having a first end, and an axial extension extending through the main passage and supported by the first fixed main shaft support, and the second fixed main shaft, e) a guide shaft, having a first end and an axial extension extending through the guide passage and the floating bushing through passage, and supported, at least in part by the floating bushing, and having a slidingly complementary surface with respect to the through passage of the floating bushing, and f) a first end coupler, coupled between the first end of the main shaft and the adjacent first end of the guide shaft.

2. The linear slider apparatus of claim 1, further including a second end coupler coupled between a second end of the main shaft, and a second end of the guide shaft.

3. The linear slider in claim 1, wherein the slider block includes a lubrication system.

4. The linear slider in claim 3, wherein the lubrication system includes passages linking the main shaft, the guide shaft, and the floating bushing for passive oil.

5. The linear slider in claim 1, wherein the main shaft is a bar having a smooth, cylindrical surface.

6. The linear slider in claim 1, wherein the guide shaft is a bar having a smooth, cylindrical surface.

7. The linear slider in claim 1, wherein the main shaft includes a coaxial, threaded end passage for end coupling.

8. The linear slider in claim 1, wherein the guide shaft includes a coaxial, threaded end passage for end coupling.

9. The linear slider in claim 1, wherein the first end coupler is fixed to the main shaft and guide shaft at least for transaxial rotations with respect to the main shaft and guide shaft.

* * * * *